Oct. 6, 1959
B. N. MAAS ET AL
2,907,548
BUTTERFLY VALVE CONSTRUCTION
Filed Aug. 17, 1955
2 Sheets-Sheet 1
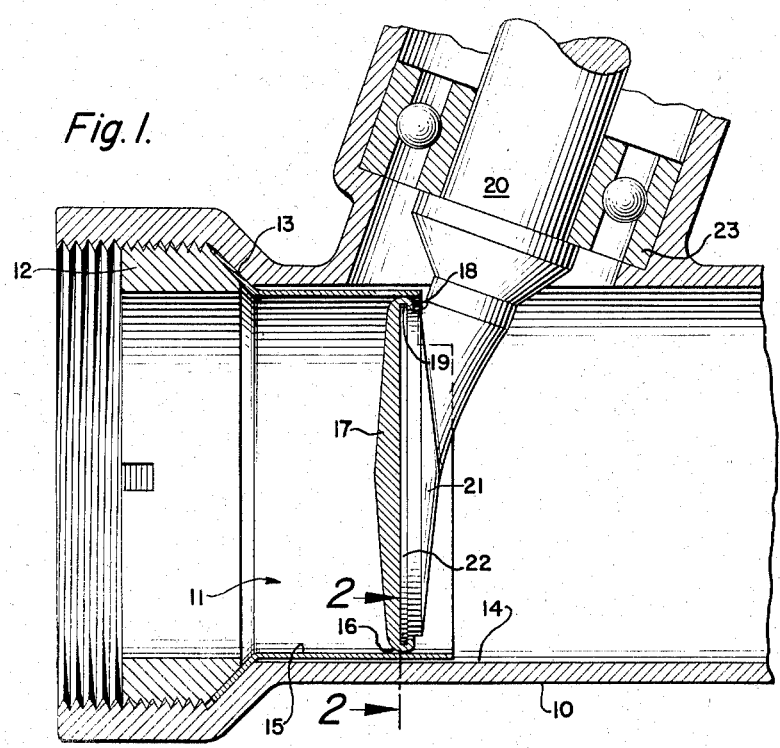
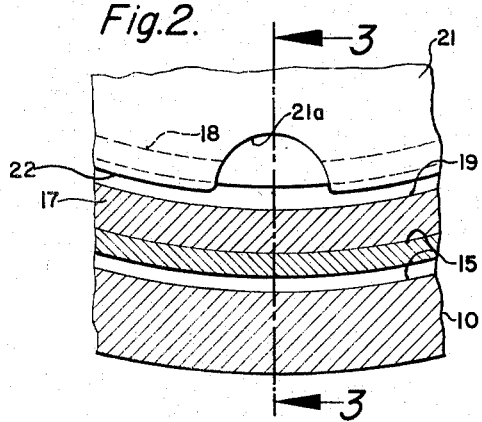
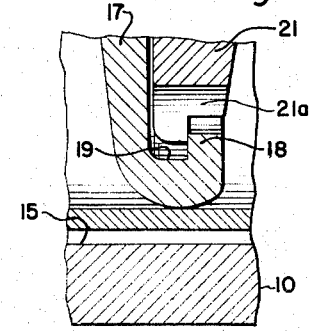
JOHN H. DAMIANI,
BERNARD N. MAAS,
ALEXANDER SILVER,
INVENTORS.
BY John H.J. Wallace

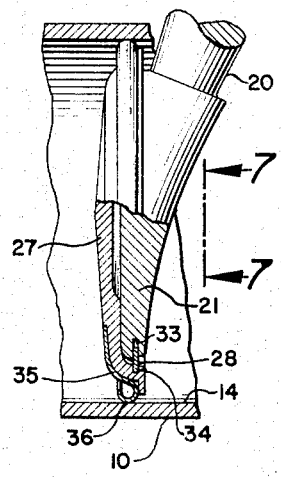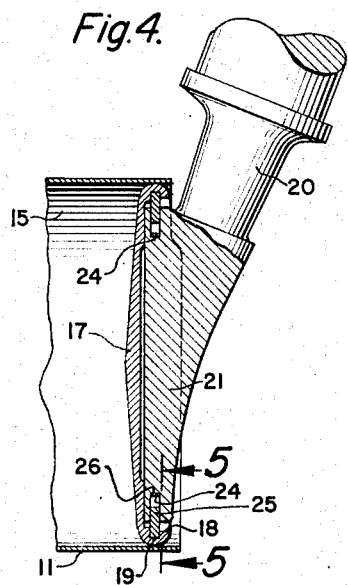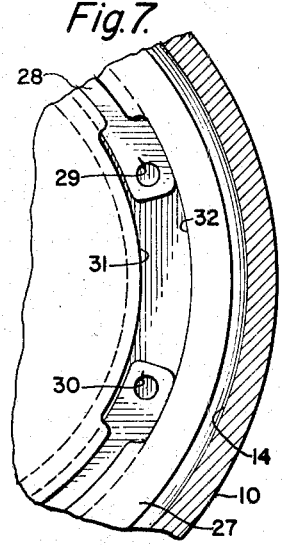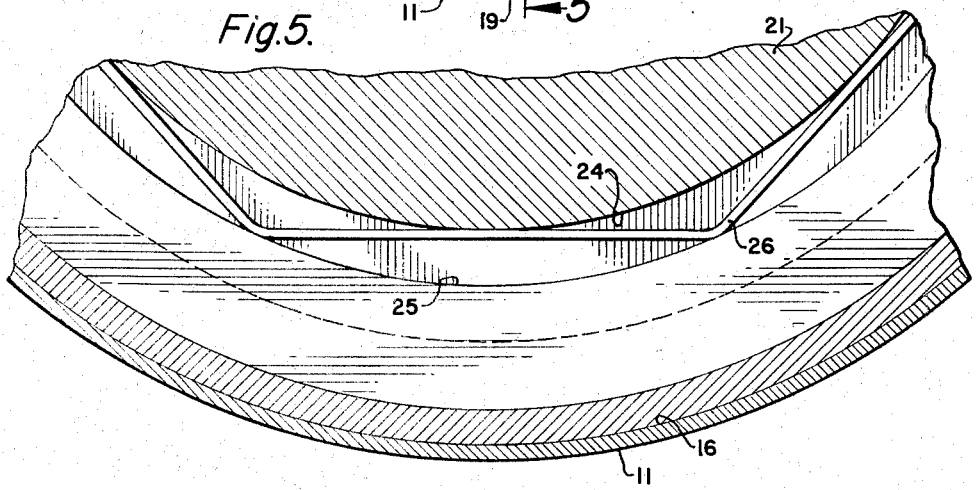

United States Patent Office 2,907,548
Patented Oct. 6, 1959

2,907,548

BUTTERFLY VALVE CONSTRUCTION

Bernard N. Maas, Scottsdale, and John H. Damiani and Alexander Silver, Phoenix, Ariz., assignors to The Garrett Corporation, Los Angeles, Calif., a corporation of California Application August 17, 1955, Serial No. 528,892

8 Claims. (Cl. 251—85)

This invention relates to a butterfly valve and sealing device, and more particularly to such a device having novel means which permits a butterfly element to center itself in a conduit bore and to thereby attain an intimate sealing engagement of its entire periphery with the wall of said bore.

Heretofore, it has been a problem to construct a butterfly valve wherein the movable sealing element automatically centers itself and provides a sufficiently intimate seal to permit only extremely minute leakage of fluid through the valve. Prior art devices which provide means for centering a butterfly element in a conduit bore usually employ perforated disc elements which permit a relatively high percentage of flow leakage therethrough. In addition, such prior art devices do not provide a combination of elements in which a concentrically arranged centering device co-operates with a flexible means at the periphery of the valve disc element whereby intimate concentric sealing engagement of the valve element with its surrounding bore wall is secured.

According to the present invention, an imperforate, leakproof disc-like valve element is supported substantially concentrically within a sleeve forming a part of a valve bore, the connection between the valve element and its support permitting the valve element to move radially a limited distance in the valve bore, thus to cause the periphery of the disc to make an intimate and efficient sealing engagement with the inner wall of the flexible sleeve means.

The foregoing features of the present invention are particularly useful in metallic structures which are capable of withstanding combined high temperatures and pressures.

The present invention is also particularly adapted to the construction of so-called spoon-type butterfly valves. These valves are characterized by a disc-shaped sealing element supported in cantilever fashion by a shaft extending into a valve passage bore and mounted to rotate the disc-shaped element into and out of closed position with respect to the bore. The shafts of such spoon valves are mounted at an angle to the axis of the disc-shaped element, and most usually at an angle, other than a right angle, to the axis of the bore. The present invention as related to such valves is particularly advantageous since it minimizes the torque necessary to crack such a valve from a closed position to an open position. This advantage is due to the fact that the device, employed to support the disc-shaped valve element on its actuating shaft, permits exact centering through movement of the disc-shaped valve element laterally of the bore when the valve is rotated about the axis of its supporting shaft.

In addition, the above mentioned features are particularly adapted for use in valves having flexible sleeves surrounding the disc-shaped valve element. When flexible sleeves are used as sealing devices in surrounding relationship with the disc-shaped valve elements of the present invention, the self-centering feature of the disc-shaped valve element minimizes lateral stresses which might be imparted to the flexible sealing sleeve, thus, greatly reducing fatigue stresses in the sleeve and prolonging the life thereof.

It is an object of the present invention to provide a valve in which a concentric centering device supports a disc-shaped valve element internally of a flexible sealing sleeve, and thereby provides for efficient sealing, reduces the torque required to operate the valve, and prolongs the life of the various parts of the valve including the sealing sleeve.

Another object of the invention is to provide a centering and sealing means which is particularly adapted for use in connection with spoon-type butterfly valves.

Another object of the invention is to provide a valve construction which permits the use of a shorter sealing sleeve externally of the periphery of a disc-shaped valve element due to minimum stresses imparted to the sleeve during operation of the valve, the stresses being minimized by the freedom of the disc-shaped valve element to center itself in the bore of the sleeve.

Another object of the invention is to provide a valve construction which, due to its centering means, alleviates the necessity for close bearing tolerances previously relied upon to locate a valve disc element concentrically in a valve passage.

Another object of the present invention is to provide a butterfly valve construction having means particularly adapted for use in centering an imperforate valve disc element.

Another object of the invention is to provide a valve disc centering device which is located near the periphery of the valve disc in order to provide a firm support for the disc, and at the same time permit freedom thereof for centering in a valve passage.

Another object of the invention is to provide a means for centering a butterfly element which has an efficient aerodynamic configuration.

A further object of the invention is to provide a valve structure which will operate freely and efficiently when handling fluids at combined high temperatures and pressures.

Other objects and advantages may be apparent from the following specification, appended claims, and accompanying drawings in which:

Figure 1 is a fragmentary axial sectional view of a valve constructed in accordance with the present invention and showing parts in elevation;

Fig. 2 is an enlarged fragmentary sectional view taken on a plane indicated by the line 2—2 of Fig. 1;

Fig. 3 is a fragmentary sectional view taken on a plane indicated by line 3—3 of Fig. 2;

Fig. 4 is a fragmentary axial sectional view of valve disc and sleeve sealing elements of a modified form of the invention;

Fig. 5 is an enlarged fragmentary sectional view taken on a plane indicated by the line 5—5 of Fig. 4;

Fig. 6 is a fragmentary axial sectional view of a further modified form of the invention and showing portions of the valve sealing elements in elevation; and Fig. 7 is an enlarged fragmentary sectional view taken on the plane indicated by the line 7—7 of Fig. 6.

As shown in Fig. 1 of the drawings, a valve constructed according to the present invention is provided with a valve body 10 having a flexible cylindrical sleeve 11 secured therein by a nut 12. The nut 12 is screw threaded in the valve body 10 and engages a conical flange 13 of the sleeve 11 for holding it in a chamber 14 of the valve body 10. The outside of the sleeve 11 is spaced from the wall of the bore 14, whereby the sleeve 11 is permitted to flex laterally in the valve body 10. The sleeve 11 is provided with a flow passage 15, the annular wall member of which is engagable by the periphery 16 of a disc-shaped valve element 17 to close the valve and interrupt fluid flow therethrough. This valve element 17 is preferably an imperforate member or it may be otherwise constructed so that it is a leakproof, disc-shaped structure which will completely seal the bore 15 of the sleeve 11 when in closed position. The disc 17 is provided with an annular flange 18 which is directed inwardly from the peripheral portion 16 thereof. The spacing of the annular flange 18 from the body of the disc 17 provides an annular recess or groove 19 having a diameter greater than the inside diameter of the flange 18. A shaft 20 having its axis disposed at an angle to the axis of the bore 15 is provided with an integral substantially flat, circular head portion 21 on which the disc-shaped valve element 17 is supported. The head portion 21 is provided with an outwardly directed annular rim 22 having an outside diameter which is slightly greater than the inside diameter of the flange 18. The outside diameter of the rim 22 is less than the inside diameter of the annular recess 19 whereby the disc 17 is free to move for a limited distance relative to the head 21, in a plane parallel to the face thereof. The diametrical difference of the annular flange 18 and annular rim 22 is slight, thereby permitting the flange 18 to be pressed over the rim 22 by a slight deflection of the flange 18. Thus, the disc 17 is installed on the circular head 21 of the shaft 20.

As shown in Figs. 2 and 3 of the drawings, the head portion 21 is provided with a notch 21a which communicates with the annular recess 19 thereby permitting a tool to be inserted behind the flange 18 for prying the disc 17 off the head 21. This arrangement permits replacement of the disc 17 when it becomes worn.

It will be noted that the disc 17 is supported in cantilever fashion in the bore 15 of the sleeve 11 by the shaft 20 which is rotatably mounted in a bearing 23 and another similar bearing, not shown, in a conventional manner. The cantilever mounting and location of the disc 17 in the bore 15 is improved by the centering means composed of the annular flange 18 and rim 22. Since the disc 17 is free to center itself in the bore 15 without imposing undue stress on the shaft 20, the location of the shaft 20 longitudinally of its axis is not extremely critical and, therefore, manufacturing tolerances in the valve construction need not be extremely close. Likewise, the axial alignment of the shaft 20 with respect to the bore 15 need not be maintained within extremely close tolerances.

Due to the fact that the valve element 17 is quite rigid, it may tend to cause slight ellipitical deformation of the sleeve 11 when it closes therein. This is due to the fact that the periphery 16 of the disc 17 is very tightly fitted in the bore 15 of the sleeve 11. The freely movable relationship of the disc 17 with respect to the shaft 20 permits the disc 17 to readily center itself in the sleeve 11 without undue deformation of the sleeve laterally relative to its axis. Thus, critical bending stresses are not imposed in the sleeve and, therefore, it may be made relatively short and somewhat rigid.

In operation, the valve shown in Fig. 1 may conduct fluid through the bore 11 of the sleeve 15 while the fluid is at high temperature and pressure. Due to the fact that the sleeve 11 and disc 17 may be constructed of metal and may be very tightly fitted relative to each other, as hereinbefore described, the leakage through the valve will be very slight under such conditions. This advantage results, also, because the disc 17 is an imperforate member subject only to a very slight leakage or none at all at its periphery where it tightly engages the wall of the sleeve 11. Its intimate engagement with the wall is facilitated by the centering means hereinbefore described which permits the entire periphery of the rigid disc to make contact with the sleeve wall. The accurate centering of the disc 17 in the sleeve 11 also avoids uneven frictional loading, which has heretofore caused sticking of butterfly valves. Thus, the break-out torque required to open a valve constructed in accordance with the present invention is nominal and may permit reduction of the bulk of the valve and its actuating mechanism.

With reference to Fig. 1 of the drawing, it will be seen that the spoon-type butterfly valve has a definite aero-dynamic flow advantage, because the supporting shaft structure projecting into the fluid flow passage is minimized and the valve disc supporting head is so contained that it permits the disc-shaped sealing element to be given a very clean aero-dynamic configuration. It will be noted that the particular combination of elements, including the spoon-type butterfly valve, the centering means for the bore sealing disc, together with the sleeve surrounding the disc, provides a very efficient valve device which may be utilized to control fluids at high temperatures and pressures.

In the modification of the present invention shown in Fig 4 of the drawings, the head 21 is annularly grooved in its outer periphery as shown at 24, to provide a flange which is disposed at the inner side of the inwardly directed recess 19 in the disc-shaped valve member 17. Disposed in the annular recess 19 and groove 24 is a resilient ring 25 which closely engages the bottom wall of the recess 19. Positioned between the ring 25 and the inner wall of the groove 24 is a plate spring 26 which tends to center the ring 25 and disc 17 with relation to the head 21 and the bore 15 of the flexible sleeve 11. The plate spring 26, as shown in Fig. 5 of the drawings, is generally a "Marcel" type spring having portions alternately engaging the inner extremities of the groove 24 and the ring 25. The ring 25 overlaps the flange 18 and the flange on head 21 a greater extent than the flange 18 and rim 22 overlap in the first form of the invention. Therefore, the ring 25 is constructed to be radially contractable, in a fashion similar to that of a conventional piston ring, so that the flange 18 of the valve disc 17 may be moved thereover while the ring 25 is held collapsed in the groove 24.

In operation, the valve disc 17 will be resiliently maintained substantially concentric with the head 21 by the spring 26 but may move laterally relative to such head a limited extent; unintentional separation of the disc 17 from the head will be prevented by the interengagement of the ring 25 and the flanges on the disc and head. This interengaging ring and flange construction also facilitates the assembly of the modified structure shown in Fig. 4 of the drawing. The valve structure shown in Fig. 4 has all the advantages of operation described with relation to the valve structure illustrated in Fig. 1 of the drawings.

In the modified form of the invention, shown in Figs. 6 and 7 of the drawings, a valve disc 27 is connected to the head portion 21 by means of a snap ring 28 having opposite ends 29 and 30 provided with openings for receiving conventional snap ring collapsing plier elements. Cutout portions 31 and 32 in the head portion 21 and disc 27 are provided to permit easy access to the ends 29 and 30 of the snap ring 28 when collapsing the latter to permit removal of the disc 27 from the head portion 21. The snap ring 28 is otherwise similar to the ring 25 hereinbefore described with respect to its interengaging relationship with the head portion 21 and the valve disc member. The head portion 21 is provided with an external annular groove 33 and the valve disc 27 is provided with an internal groove 34, both grooves receiving the snap ring 28. Fused to the disc 27 in a leakproof relationship therewith is a flexible metallic sealing element 35 which has a peripheral sealing surface 36 adapted to intimately engage the wall of the bore 14 of a rigid valve body 10. This combination of elements renders the valve disc 27 and the flexible means 35 carried by the disc, free for limited movement toward the interior wall of the valve body. The flexible sealing element 35 may be used in place of the flexible sleeve 11 as disclosed in Fig. 1 of the drawings.

In operation of the modified structure shown in Fig. 6 of the drawings, the disc 27 automatically centers itself in the bore 14 due to freedom thereof to move laterally of the axis of the bore 14 provided by the ring 28 interengaging the walls of the annular grooves 33 and 34 in the head 21 and the valve disc 27. The flexible sealing element 35 is constructed of metal capable of resilient engagement with the wall of the flow passage of the valve and of readily withstanding high temperatures and pressures.

The modified form of the invention shown in Figs. 6 and 7 of the drawings, includes the valve element centering advantages hereinbefore described in connection with the other species of the generic invention.

It is understood that further modifications of the present invention may be resorted to in a manner limited only by a just interpretation of the following claims.

We claim:

1. In a valve, a body forming a flow-conducting bore; a valve-supporting head disposed for pivotal movement about an axis extending across said bore; an imperforate disc-like valve element carried by said supporting head for pivotal movement therewith, said vale element being substantially equal in diameter to and disposed at all times in said bore, said valve element having a peripheral portion extending partially around said head; and means providing interengaging planar surfaces between the peripheral portion of said valve element and head to retain the valve on said head, said planar surfaces being disposed in parallel relationship to the plane of said valve member and providing for limited movement of said valve member relative to said head in a direction parallel to such plane.

2. In a valve, a body forming a flow-conducting bore; a valve-supporting head disposed for pivotal movement about an axis extending transversely of said bore; and an imperforate disc-like valve element of a diameter substantially equal to that of said bore carried by said supporting head for pivotal movement therewith, said head and valve element being disposed at all times within said bore and having peripherally disposed oppositely facing interengaging planar surfaces to retain said valve element on said head, said valve element being movable to a limited extent relative to said head in a plane substantially parallel to that of said disc-like valve element.

3. In a valve, a body forming a flow-conducting bore; a valve-supporting head disposed for pivotal movement about an axis extending transversely of said bore; an imperforate disc-like valve element of a diameter substantially equal to that of said bore carried by and pivotally movable with said supporting head; and annular retaining means in inter-engaging relationship with said head and valve element, said retaining means and valve element having interengaging planar surfaces to provide for limited movement of said valve element relative to said head in a plane substantially parallel to that of said disc-like valve element.

4. In a valve, a body forming a flow-conducting bore; a valve-supporting head disposed for pivotal movement in said bore, said head being formed with a peripheral groove; a substantially disc-like valve element carried by said head, said valve element having an annular groove registering with the groove in said head; and means disposed in the registering grooves to retain said valve element on said head, said means being shaped and sized to provide for edgewise movement of said valve element relative to said head.

5. In a valve, a body forming a flow-conducting bore; a valve-supporting head disposed for pivotal movement in said bore; a substantially disc-like valve element carried by said head, said valve element and head having registering annular grooves; and means disposed in said registering grooves for yieldably retaining said valve element in a predetermined position on said head, said means occupying a portion only of one of said grooves to provide for edgewise movement of said valve element relative to said head.

6. In a valve, a body forming a flow-conducting bore; a valve-supporting head disposed for pivotal movement in said bore; a substantially disc-like valve element carried by said head; resilient means tending to maintain said valve element and said head in a predetermined relation; and retaining means securing said valve element on said head, said retaining means providing for and restricting said valve element to limited edgewise movement on said supporting head.

7. In a valve, a body forming a flow-conducting bore; a valve-supporting head disposed for pivotal movement in said bore; a substantially disc-like valve element carried by said head; and a flat snap ring disposed in part in said head and said valve element, the size relation of said head, said snap ring and said valve element and the position of said snap ring providing for limited edgewise movement of said valve element.

8. In a butterfly valve, the combination of: a body forming a flow conducting bore; a valve support disposed for pivotal movement about an axis extending across said bore; an imperforate substantially rigid disc-like valve element carried by said support, said valve element being disposed at all times in said bore; means retaining said valve element on said support and guiding said element for limited movement relative to said body in a plane substantially parallel to said valve element; and means providing a flexible sealing engagement between the periphery of said valve element and said bore when said valve element is in a closed position.

References Cited in the file of this patent

UNITED STATES PATENTS

| 1,034,370 | McCarty | July 30, 1912 |
| 2,054,064 | Anderson | Sept. 15, 1936 |

FOREIGN PATENTS

| 22,932 | Great Britain | of 1911 |